US012095357B2

(12) United States Patent
Wang et al.

(10) Patent No.: US 12,095,357 B2
(45) Date of Patent: Sep. 17, 2024

(54) OVERLOAD OPERATING METHOD FOR T-TYPE 3-LEVEL CONVERTERS

(71) Applicant: GINLONG TECHNOLOGIES CO., LTD., Ningbo (CN)

(72) Inventors: Yiming Wang, Ningbo (CN); Po Xu, Ningbo (CN); Wenping Zhang, Ningbo (CN); Wanshuang Lin, Ningbo (CN); Kun Xia, Ningbo (CN); Xu Cai, Ningbo (CN)

(73) Assignee: GINLONG TECHNOLOGIES CO., LTD., Ningbo (CN)

( * ) Notice: Subject to any disclaimer, the term of this patent is extended or adjusted under 35 U.S.C. 154(b) by 0 days.

(21) Appl. No.: 18/030,803

(22) PCT Filed: Oct. 26, 2022

(86) PCT No.: PCT/CN2022/127530
§ 371 (c)(1),
(2) Date: Apr. 7, 2023

(87) PCT Pub. No.: WO2023/216518
PCT Pub. Date: Nov. 16, 2023

(65) Prior Publication Data
US 2024/0266946 A1 Aug. 8, 2024

(30) Foreign Application Priority Data

May 9, 2022 (CN) .......................... 202210497818.3

(51) Int. Cl.
*H02M 1/32* (2007.01)
*H02H 7/122* (2006.01)
(Continued)

(52) U.S. Cl.
CPC ............ *H02M 1/32* (2013.01); *H02H 7/1227* (2013.01); *H02M 7/483* (2013.01); *H02M 7/5395* (2013.01)

(58) Field of Classification Search
CPC ...... H02M 1/32; H02M 7/483; H02M 7/5395; H02H 7/1227
See application file for complete search history.

(56) References Cited

U.S. PATENT DOCUMENTS

2003/0095424 A1    5/2003   Oates
2014/0247629 A1    9/2014   Crane et al.
(Continued)

OTHER PUBLICATIONS

CNIPA, Notification of a First Office Action for CN202210497818.3, Jun. 27, 2022.
(Continued)

*Primary Examiner* — Rafael O De Leon Domenech
(74) *Attorney, Agent, or Firm* — Zhigang Ma

(57) ABSTRACT

The present disclosure discloses a T-shaped three-level overload operating system, including a three-level topology and an overload mode switching system. The topology is connected with a first device group and a second device group which form a T shape; the first device group is designed with an overload capacity, and the second device group is designed with a rated capacity; and the overload mode switching system is configured for being connected to the topology to control the first device group to perform overload two-level operation on the topology, or to control the second device group to perform normal three-level operation on the topology, so that the number of device groups of the overload design can be effectively reduced, and then the cost of the system can be reduced. A working method of the T-shaped three-level overload operating system is further disclosed. The topology can be rapidly (Continued)

switched among working modes according to an output current of the topology.

10 Claims, 7 Drawing Sheets

(51) Int. Cl.
    *H02M 7/483*     (2007.01)
    *H02M 7/5395*     (2006.01)

(56) References Cited

U.S. PATENT DOCUMENTS

| | | | |
|---|---|---|---|
| 2017/0093300 A1 | 3/2017 | Akre | |
| 2022/0311238 A1* | 9/2022 | Gaeta | H02H 7/0833 |
| 2023/0344423 A1* | 10/2023 | Shimizu | H03K 17/0822 |

OTHER PUBLICATIONS

CNIPA, Notification to grant patent right for invention in CN202210497818.3, Jul. 7, 2022.

* cited by examiner

OVERLOAD OPERATING METHOD FOR T-TYPE 3-LEVEL CONVERTERS

TECHNICAL FIELD

The present disclosure relates to the field of inverter control, in particular, to an overload operating for 3-level converters.

BACKGROUND

Compared with two-level inverters, 3-level inverters have the advantages. For instance, the voltage stress on switching devices is only half of the DC-bus voltage and the output harmonics can be significantly reduced.

In order to operate under overload conditions for 3-level converters, the traditional method is to design all semiconductors in the topology with an overload capacity. The main disadvantage of this method is the system costs high. Furthermore, the inverter runs at rated power most of time. This means the additional overload capacity is not fully utilized.

SUMMARY

One objective of the present disclosure is to provide a T-shaped three-level overload operating system that can reasonably use the overload capacity.

Another objective of the present disclosure is to provide working method of a T-shaped three-level overload operating system that can reasonably use the overload capacity.

In order to achieve the above objective, the technical solution adopted by the present disclosure: A T-shaped three-level overload operating system includes a three-level topology and an overload mode switching system. The topology is connected to a first device group and a second device group which form a T shape; the first device group is designed with an overload capacity, and the second device group is designed with a rated capacity; and the overload mode switching system is configured for being connected to the topology to control the first device group to perform overload two-level operation on the topology, or to control the first device group and the second device group to perform normal three-level operation on the topology.

Preferably, the overload mode switching system includes a control module, a channel calculating module, a pulse width modulation module and an over-load blocking module which are connected in sequence, and further includes a current comparison module; the current comparison module is connected to the topology, the control module and the over-load blocking module; the current comparison module is configured for making a judgment on an output current of the topology and sending a judgment result to the channel calculating module in the form of a level signal; in addition, the control module is configured for sending a duty cycle signal to the channel calculating module; the channel calculating module is configured for sending a modulation waveform comparison count value to the pulse width modulation module according to the level signal and the duty cycle signal; the pulse width modulation module is configured for generating control signals corresponding to the first device group and the second device group according to the modulation waveform comparison count value and sending the control signals to the over-load blocking module; and the over-load blocking module is configured for respectively sending on-off signals to the first device group and the second device group according to the control signals and the level signal such that the first device group or the second device group switches on or switches off the topology.

Preferably, the current comparison module includes a rated current comparison module and a maximum current comparison module; when an output current of the topology is less than a rated current, the rated current comparison module and the maximum current comparison module both output high-level signals; when the output current of the topology is greater than the rated current and less than a maximum current, the rated current comparison module outputs a low-level signal, and the maximum current comparison module outputs a high-level signal; when the rated current of the topology is greater than the maximum current, the rated current comparison module and the maximum current comparison module both outputs low-level signals; and the rated current comparison module is configured for sending the output level signal to the channel calculating module and the over-load blocking module, and the maximum current comparison module is configured for sending the output level signal to the over-load blocking module.

Preferably, the channel calculating module includes a first channel selection unit, a second channel selection unit, a first calculation unit, a second calculation unit and a third calculation unit; the first channel selection unit is configured for receiving the level signal output by the rated current comparison module; an input end of the first channel selection unit is connected to the control module; an output end of the first channel selection unit is connected to input ends of the third calculation unit and the second channel selection unit respectively; an output end of the second channel selection unit is communicated with the first calculation unit and the second calculation unit respectively; when the level signal is at a low level, the duty cycle signal is directly transmitted to the third calculation unit to calculate a modulation waveform comparison count value; and when the level signal is at a high level, the duty cycle signal is transmitted to the second channel selection unit, and is transmitted to the first calculation unit or the second calculation unit according to positive and negative states of the duty cycle signal to calculate a modulation waveform comparison count value.

Preferably, the over-load blocking module includes a first AND group and a second AND group; an output end of the first AND group is correspondingly connected to the first device group, and an output end of the second AND group is correspondingly connected to the second device group; an interface of an input end of the first AND group respectively receives the level signal output by the maximum current comparison module and the control signal correspondingly output by the pulse width modulation module, so that the first AND group controls, according to a level state of the input end, the first device group to switch on or switch off the topology; and an interface of an input end of the second AND group respectively receives the level signal output by the rated current comparison module and the control signal correspondingly output by the pulse width modulation module, so that the second AND group controls, according to a level state of the input end, the second device group to switch on or switch off the topology.

Preferably, the T-shaped three-level overload operating system further includes a temperature control system capable of modulating frequency; the temperature control system capable of modulating frequency includes a temperature collection module, a conversion module and a third channel selection unit; the temperature collection module is configured for collecting an ambient temperature of the T-shaped three-level overload operating system; the conversion module is configured for receiving varying temperature signals sent by the temperature collection module and converting the temperature signals into different triangular modulation waveform peak signals; an input end of the third channel selection unit is connected to the conversion module, and an output end of the third channel selection unit is connected to the pulse width modulation module; the third channel selection unit is configured for sending the different triangular modulation waveform peak signals to the pulse width modulation module according to the level signal of the rated current comparison module, thereby adjusting a frequency of the control signal sent by the pulse width modulation module.

A working method of the T-shaped three-level overload operating system includes the following steps:

S100: sending, by the control module, the duty cycle signal to the channel calculating module;

S200: detecting and making a judgment, by the current comparison module, on the output current of the topology, and sending out a judgment result in the form of a level signal;

S300: receiving, by the channel calculating module, the duty cycle signal and the level signal, and calculating multiple groups of modulation waveform comparison count values corresponding to the first device group and the second device group according to the level of the level signal and positive and negative states of the duty cycle signal;

S400: sending, by the pulse width modulation module, each group of modulation waveform comparison count values to the over-load blocking module in the form of a control signal;

S500: sending, by the over-load blocking module, the on-off signals to the first device group and the second device group respectively according to the level signal and the control signal; and S600: converting, by the conversion module, the ambient temperature collected by the temperature collection module into different triangular modulation waveform peak signals, and sending, by the third channel selection unit, different triangular modulation waveform peak signals to the pulse width modulation module according to the level signal to adjust the frequencies of the control signals;

wherein the first device group includes a semiconductor device $S_1$ and a semiconductor device $S_3$, and the second device group includes a semiconductor device $S_2$ and a semiconductor device $S_4$.

Preferably, step S200 includes the following specific steps:

S210: detecting, by the current comparison module, that an output current of the topology is $i_0$, and comparing the output current $i_0$ with a rated current $I_{rate}$ and a maximum current $I_{max}$;

S220: outputting, by both the rated current comparison module and the maximum current comparison module, high-level signals if an absolute value of the output current $i_0$ is less than the rated current $I_{rate}$, otherwise, executing the next step; and S230: if an absolute value of the output current $i_0$ is greater than the rated current $I_{rate}$ and less than the maximum current $I_{max}$, outputting, by the rated current comparison module, a low-level signal, and outputting, by the maximum current comparison module, a high-level signal; otherwise, outputting, by both the rated current comparison module and the maximum current comparison module, low-level signals.

Preferably, step S300 includes the following specific steps:

S310: receiving, by the first channel selection unit, the level signal $a_1$ of the rated current comparison module and value d of the duty cycle signal;

S320: if the level signal $a_1$ is at a low level, transmitting, by the first channel selection unit, value d of the duty cycle signal to the third calculation unit, and calculating and obtaining, by the third calculation unit, the modulation waveform comparison count values CMP-13 and CMP-24, and CMP-13=CMP-24=[(1+d)/2]× $C_{max}$; if the level signal $a_1$ is at a high level, executing the following steps:

S330: sending, by the first channel selection unit, value d of the duty cycle signal to the second channel selection unit;

S340: if value d of the duty cycle signal is greater than or equal to 0, sending, by the second channel selection unit, value d of the duty cycle signal to the first calculation unit, and calculating and obtaining, by the first calculation unit, the modulation waveform comparison count values CMP-13=d×$C_{max}$ and CMP-24=$C_{max}$; otherwise, executing the next step; and S350: if value d of the duty cycle signal is less than 0, sending, by the second channel selection unit, value d of the duty cycle signal to the second calculation unit, and calculating and obtaining, by the second calculation unit, the modulation waveform comparison count values CMP-13=0 and CMP-24=(1+d)× $C_{max}$;

wherein CMP-13 represents the modulation waveform comparison count values of the semiconductor devices $S_1$ and $S_3$; CMP-24 represents the modulation waveform comparison count values of the semiconductor devices $S_2$ and $S_4$; and $C_{max}$ represents a maximum triangular wave count value of the pulse width modulation module.

Preferably, step S600 includes the following specific steps:

S610: collecting, by the temperature collection module, an ambient temperature T, and sending the ambient temperature to the conversion module;

S620: converting, by the conversion module, the temperature T into a triangular wave peak value $C_{max-T}$, and transmitting the triangular wave peak value $C_{max-T}$ in the form of a triangular modulation waveform peak signal;

S630: receiving, by the third channel selection unit, the triangular modulation waveform peak signal and the level signal $a_1$ of the rated current comparison module;

S640: if the level signal $a_1$ is at a high level, sending, by the third channel selection unit, the triangular modulation waveform peak signal to the pulse width modulation module such that the maximum triangular wave count value $C_{max}$ is a constant value $C_{max-rate}$ and the pulse width modulation module works at a constant frequency; if the level signal $a_1$ is at a low level, executing the next step; and S650: sending, by the third channel selection unit, the triangular wave peak signal to the pulse width modulation module such that the maximum triangular wave count value $C_{max}$ is a triangular wave peak value $C_{max-T}$ that changes with the temperature T, and the pulse width modulation module works at a constant frequency or variable frequencies.

Compared with the prior art, the present disclosure has the beneficial effects below:

(1) When the output current of the topology is low, the system can perform normal three-level operation. When the output current of the topology is greater than the rated current and less than the maximum overload current, the system can perform the two-level operation by means of the first device group. In this way, the first device group can be designed with the overload capacity, and the second device group can be designed with the rated capacity, so that the system cost can be greatly reduced.

(2) The present disclosure is still designed according to the original three-level heating situation, so that after the two-level overload operation is performed on the topology, the system can work at variable frequencies as the temperature changes, so as to avoid the temperature of the system from exceeding a system allowable value, thus ensuring no increase in the heat dissipation cost of the system.

Figure 1:
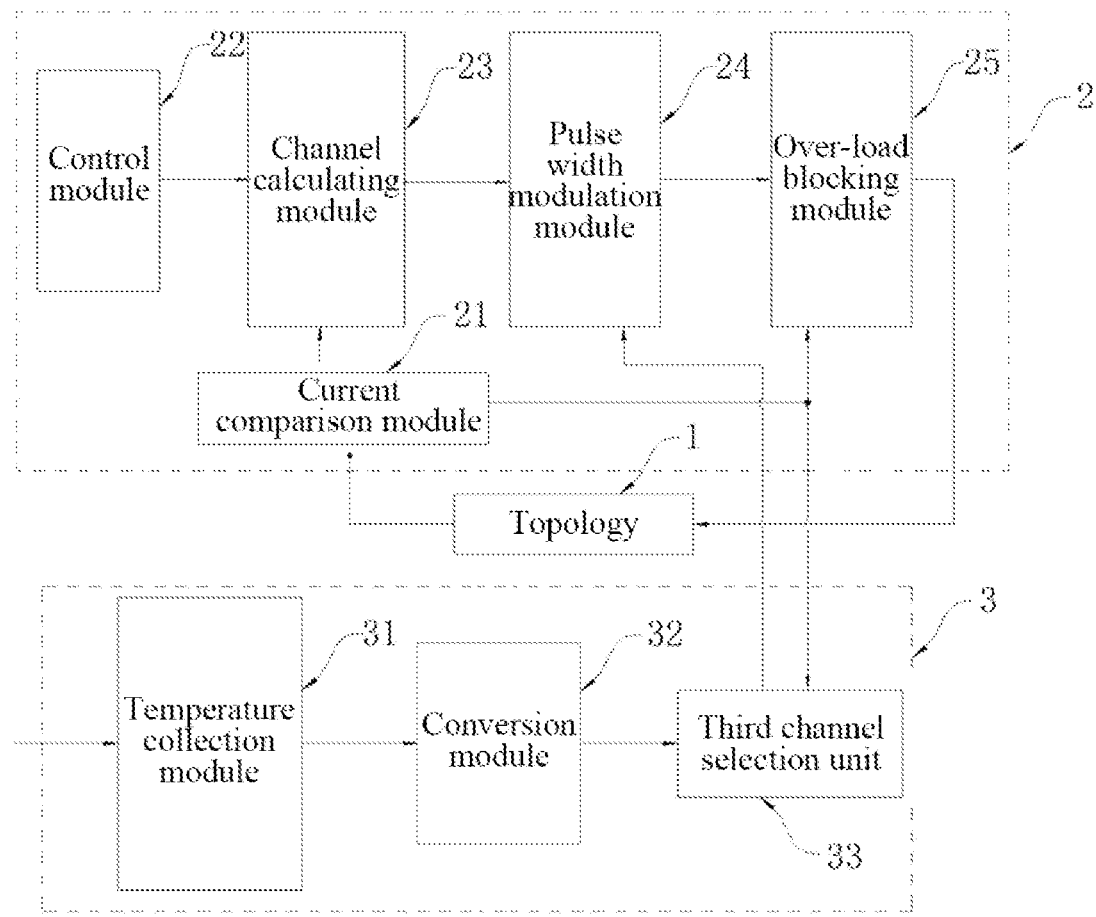
FIG. 1 is a schematic diagram of an overall process of the present disclosure.

In the drawings: topology 1, first device group 11, second device group 12, overload mode switching system 2, current comparison module 21, rated current comparison module 211, maximum current comparison module 212, control module 22, channel calculating module 23, first channel selection unit 231, second channel selection unit 232, first calculation unit 233, second calculation unit 234, third calculation unit 235, pulse width modulation module 24, over-load blocking module 25, first AND unit 251, second AND unit 252, third AND unit 253, fourth AND unit 254, temperature control system capable of modulating frequency 3, temperature collection module 31, conversion module 32, and third channel selection unit 33.

DETAILED DESCRIPTION OF THE EMBODIMENTS

The present disclosure is further described below in combination with specific implementations. It should be noted that the various embodiments or technical features described below can be arbitrarily combined to form new embodiments without conflicts.

In the description of the present disclosure, it should be noted that for orientation terms, orientations or positional relationships indicated by the terms "center", "transverse", "longitudinal", "length" "width", "thickness", "upper", "lower", "front", "rear", "left", "right", "vertical", "horizontal", "top", "bottom", "inside", "outside", "clockwise", "anticlockwise", and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms cannot construed as limiting the specific protection scope of the present disclosure.

It should be noted that the terms "first", "second", etc. in the specification and claims of the present disclosure are used to distinguish similar objects, and do not have to be used to describe a specific order or sequence.

One aspect of the present disclosure provides a T-shaped three-level overload operating system, as shown in FIG. 1 to FIG. 7, in one preferred embodiment, including a three-level topology 1 and an overload mode switching system 2. The topology 1 is connected with a first device group 11 and a second device group 12 which form a T shape. The first device group 11 is designed with an overload capacity, and the second device group 12 is designed with a rated capacity. The overload mode switching system 2 is configured for being connected to the topology 1, so that the overload mode switching system 2 can control, according to an output current of the topology 1, the first device group 11 to perform overload two-level operation on the topology 1, or control the first device group 11 and the second device group 12 to perform normal three-level operation on the topology 1.

It can be understood that when an output current of the topology 1 is not overloaded, the overload mode switching system 2 can control the topology 1 to be operated through a three-level circuit formed by the first device group 11 and the second device group 12. When the output current of the topology 1 is overloaded, the overload mode switching system 2 can control the topology 1 to be subjected to overload operation by a two-level circuit formed by switching on the first device group 11. At this time, the second device group 12 is in a blocked state. Thus, the overload mode switching system 2 can completely distinguish an overload operation from a normal operation of the topology 1. A design requirement of the topology 1 for the overload capacity can be effectively loaded when compared with the traditional design requirement, so as to reduce the system cost.

Figure 2:
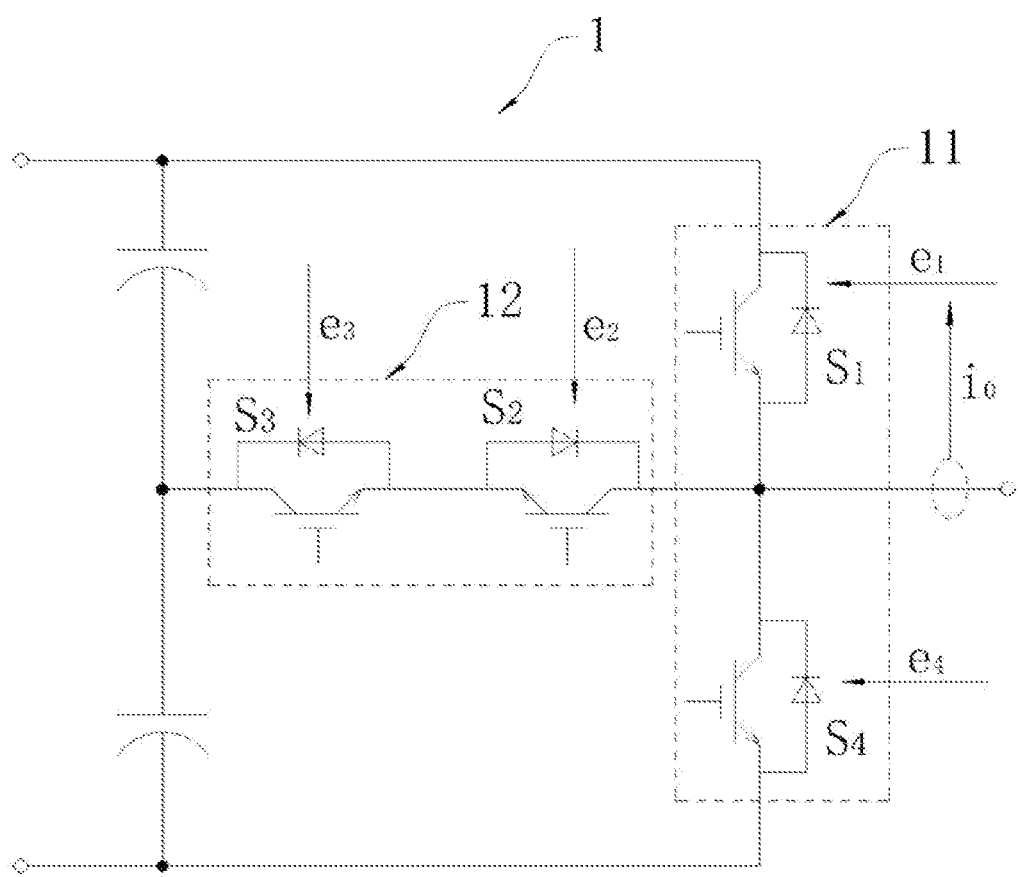
FIG. 2 is a schematic diagram of a topology of the present disclosure.

In this embodiment, as shown in FIG. 2, the circuit connection way of the topology 1 is the same or similar to that of the prior art, and the topology 1 is connected with a horizontal device group and a vertical device group which form a T shape. The first device group 11 can be a horizontal device group or a vertical device group, and the second device group 12 can be a vertical device group or a horizontal device group. Any specific design way can be selected. For example, as shown in FIG. 2, the first device group 11 adopts the overload capacity design for vertical device group, and the second device group 12 adopts the rated capacity design for the horizontal device group.

Specifically, as shown in FIG. 2, each of the first device group 11 and the second device group 12 includes two semiconductor devices. For the convenience of description, the two semiconductor devices of the first device group 11 can be marked as $S_1$ and $S_4$ respectively, and the two semiconductor devices of the second device group 12 can be marked as $S_2$ and $S_3$ respectively. The specific connection way of the semiconductor devices $S_1$, $S_2$, $S_3$ and $S_4$ in the topology 1 is familiar to those skilled in the art, and will not be described in detail here.

In one embodiment of the present disclosure, as shown in FIG. 1, the overload mode switching system 2 includes a control module 22, a channel calculating module 23, a pulse width modulation module 24, an over-load blocking module 25, and a current comparison module 21 that can be connected with each other. The current comparison module 21 is respectively connected to the topology 1, the control module 22 and the over-load blocking module 25, so that the current comparison module 21 can detect and make a judgment on the output current of the topology 1, and send a judgment result to the channel calculating module 23 in the form of a level signal, while the control module 22 will continuously send a duty cycle signal to the channel calculating module 23. The channel calculating module 23 can send a modulation waveform comparison count value to the pulse width modulation module 24 according to the level signal and the duty cycle signal. The pulse width modulation module 24 can generate control signals corresponding to the first device group 11 and the second device group 12 according to the received modulation waveform comparison count value and send the control signals to the over-load blocking module 25. The over-load blocking module 25 can send on-off signals to the first device group 11 and the second device group 12 according to the control signals and level signal, so that the first device group 11 or the second device group 12 can switch on or off the topology 1.

It can be understood that by means of the current comparison module 21 and the channel calculating module 23, the overload mode switching system 2 can realize fast configuration of the modulation waveform comparison count value required for pulse width modulation by the topology 1 in the two working modes, so as to ensure that the overload mode switching system 2 can smoothly and quickly switch the topology 1 between the two working modes.

In this embodiment, the duty cycle signal of the control module 22 is a reference signal output by means of a controller, and has positive and negative states which change with a value of a reference wave.

Figure 3:
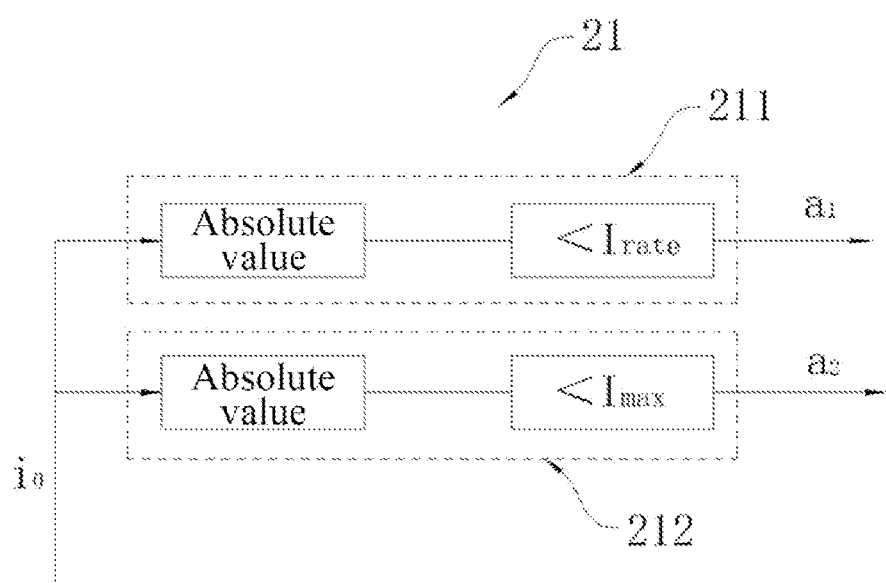
FIG. 3 is a schematic diagram of a circuit comparison module in the present disclosure.
Figure 4:
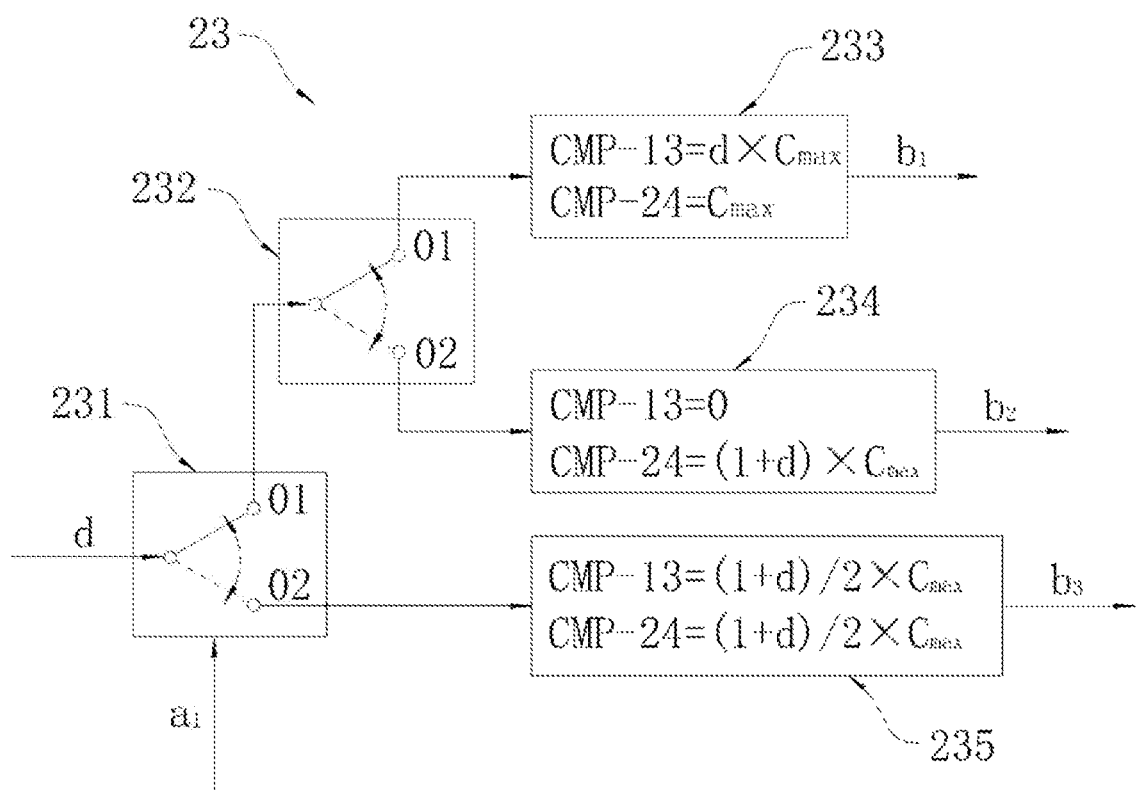
FIG. 4 is a schematic diagram of a channel calculating module in the present disclosure.

In this embodiment, as shown in FIG. 3, the current comparison module 21 includes a rated current comparison module 211 and a maximum current comparison module 212. When the output current of the topology 1 is less than a rated current, both the rated current comparison module 211 and the maximum current comparison module 212 output high-level signals. When the output current of the topology 1 is greater than the rated current and less than a maximum current, the rated current comparison module 211 outputs a low-level signal, and the maximum current comparison module 212 outputs a high-level signal. When a rated current of the topology 1 is greater than the maximum current, both the rated current comparison module 211 and the maximum current comparison module 212 output low-level signals. The rated current comparison module 211 can send an output level signal to the channel calculating module 23 and the over-load blocking module 25, and the maximum current comparison module 212 can send an output level signal to the over-load blocking module 25.

It can be understood that since the topology 1 outputs an alternating current, the current comparison module 21 needs to take an absolute value of the output current of the topology 1 before making a judgment on the output current of the topology 1, so as to ensure the accuracy of the judgment result.

In this embodiment, the channel calculating module 23 includes a first channel selection unit 231, a second channel selection unit 232, a first calculation unit 233, a second calculation unit 234 and a third calculation unit 235. An input end of the first channel selection unit 231 is connected to the control module 22. An output end of the first channel selection unit 231 is connected to input ends of the third calculation unit 235 and the second channel selection unit 232 respectively. In addition, the first channel selection unit 231 can select a channel by means of receiving the level signal output by the rated current comparison module 211. Thus, when the rated current comparison module 211 outputs a low-level signal, the channel of the first channel selection unit 231 is from the output end to the third calculation unit 235, so that the duty cycle signal sent by the control module 22 can be directly transmitted to the third calculation unit 235 to calculate a corresponding modulation waveform comparison count value. When the rated current comparison module 211 outputs a high-level signal, the channel of the first channel selection unit 231 is from the output end to the second channel selection unit 232, so that the duty cycle signal sent by the control module 22 can be transmitted to the input end of the second channel selection unit 232. The output end of the second channel selection unit 232 is respectively communicated with the first calculation unit 233 and the second calculation unit 234. In addition, the second channel selection unit 232 can select a channel according to the positive and negative states of the duty cycle signal. Thus, when the duty cycle signal is positive, the channel of the second channel selection unit 232 is from the output end to the first calculation unit 233, so that the duty cycle signal can be transmitted to the first calculation unit 233 to calculate a corresponding modulation waveform comparison count value. When the duty cycle signal is negative, the channel of the second channel selection unit 232 is from the output end to the second calculation unit 234, so that the duty cycle signal can be transmitted to the second calculation unit 234 to calculate a corresponding modulation waveform comparison count value.

It can be understood that the modulation waveform comparison count values calculated by the first calculation unit 233, the second calculation unit 234 and the third calculation unit 235 are different.

In addition, the structures of the first channel selection unit 231 and the second channel selection unit 232 can be regarded as one logical switch structure, and may have a plurality of output ends, preferably two output ends respectively marked as 01 and 02, so that the channels of the first channel selection unit 231 and the second channel selection unit 232 can be represented as connection between a switch and the output end 01 or connection between a switch and the output end 02.

At this time, one of the preferred connection ways of the channel calculating module 23 can be as follows: the output end 01 of the first channel selection unit 231 is connected to the input end of the second channel selection unit 232, and the output end 02 of the first channel selection unit 231 is connected to the third calculation unit 235. The output ends 01 and 02 of the second channel selection unit 232 are connected to the first calculation unit 233 and the second calculation unit 234 respectively.

According to the above connection way, a working process of the channel calculating module 23 is as follows: When the level signal of the rated current comparison module 211 is transmitted to the first channel selection unit 231, if the level signal is at a low level, the switch of the first channel selection unit 231 is communicated with the output end 02, so that the duty cycle signal of the control module 22 can be transmitted to the third calculation unit 235. At this time, the second channel selection unit 232 is disconnected from the first channel selection unit 231. If the level signal is at a high level, the switch of the first channel selection unit 231 is connected to the output end 01, so that the duty cycle signal of the control module 22 can be transmitted to the input end of the second channel selection unit 232. At this time, the third calculation unit 235 is disconnected from the first channel selection unit 231. Then, the second channel selection unit 232 makes a judgment on the positive and negative states of the duty cycle signal. If the duty cycle signal is positive, the switch of the second channel selection unit 232 is connected to the output end 01, so that the duty cycle signal is transmitted to the first calculation unit 233. If the duty cycle signal is negative, the switch of the second channel selection unit 232 is connected to the output end 02, so that the duty cycle signal is transmitted to the second calculation unit 234.

In this embodiment, the modulation waveform comparison count value is a comparison value of any semiconductor device in the first device group 11 to any semiconductor device the second device group 12. That is, the semiconductor device $S_1$ is compared with the semiconductor device $S_2$ or $S_3$, and the semiconductor device $S_4$ is compared with the semiconductor device $S_3$ or $S_2$. Specific selections can be set according to actual needs. Preferably, the semiconductor device $S_1$ in the first device group 11 is compared with the semiconductor device $S_3$ in the second device group 12, which can be expressed as CMP-13, while the semiconductor device $S_4$ in the first device group 11 is compared with the semiconductor device $S_2$ in the second device group 12, which can be expressed as CMP-24.

Calculation formulas of the first calculation unit 233 for CMP-13 and CMP-24 are: CMP-13=d×$C_{max}$, CMP-24=$C_{max}$, where d represents a value of the duty cycle signal, and $C_{max}$ represents a maximum triangular wave count value of the pulse width modulation module 24.

Meanwhile, calculation formulas of the second calculation unit 234 for CMP-13 and CMP-24 are: CMP-13=0, CMP-24=(1+d)× $C_{max}$.

Calculation formula of the third calculation unit 235 for CMP-13 and CMP-24 are:

$$CMP-13 = CMP-24 = (1 + d)/2 \times C_{max}.$$

Figure 5:
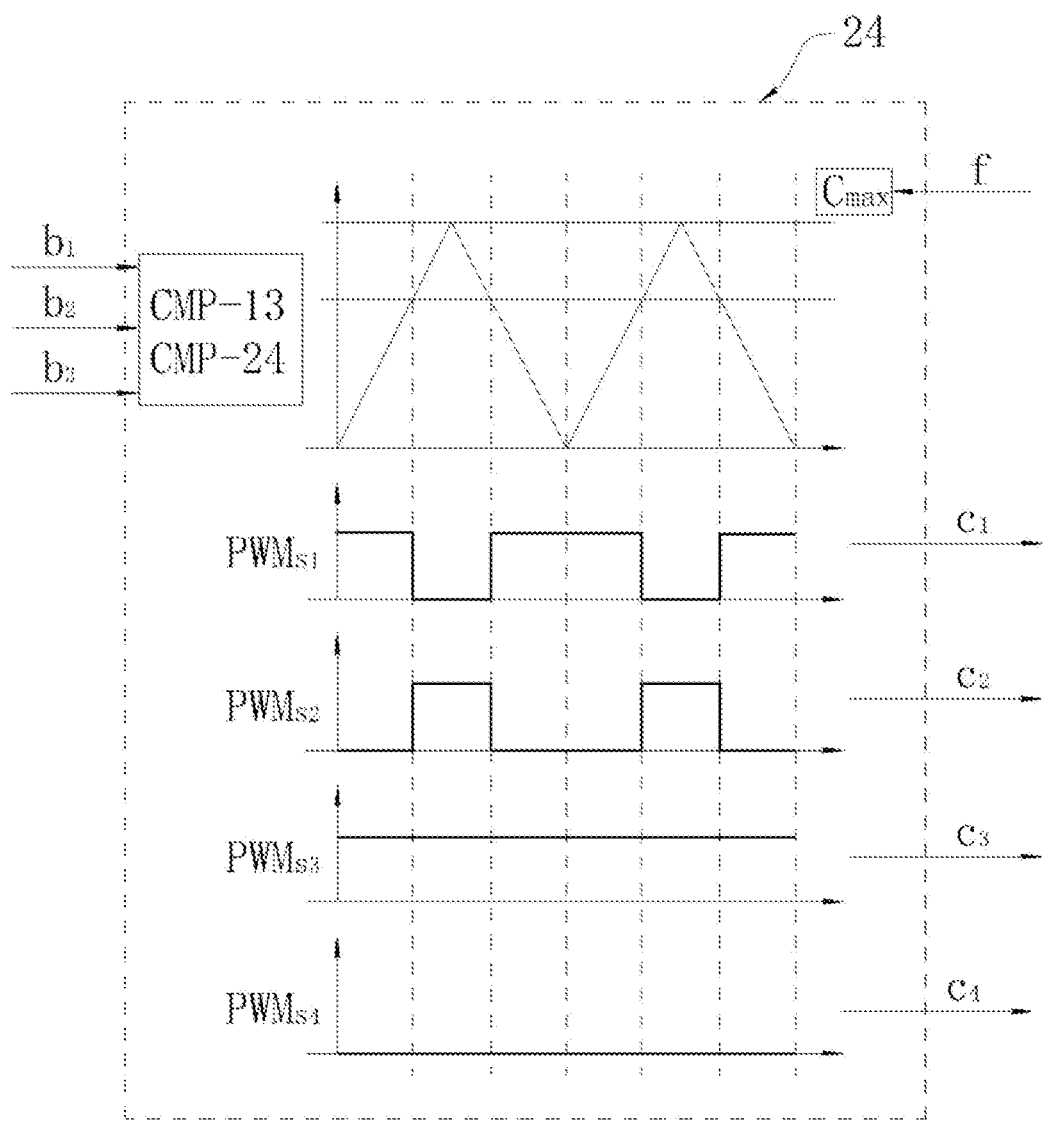
FIG. 5 is a schematic diagram of working of a pulse width modulation module in the present disclosure.

In this embodiment, as shown in FIG. 5, the pulse width modulation module 24 can receive the modulation waveform comparison count values CMP-13 and CMP-24 sent by the first calculation unit 233, the second calculation unit 234 and the third calculation unit 235, and generate control signals $PWM_{S1}$, $PWM_{S2}$, $PWM_{S3}$ and $PWM_{S4}$ corresponding to semiconductor devices $S_1$, $S_2$, $S_3$ and $S_4$ from CMP-13 and CMP-24 through an algorithm.

It can be understood that the pulse width modulation module 24 can substitute the modulation waveform comparison count values CMP-13 and CMP-24 into a triangular wave pulse, so that the control signals $PWM_{S1}$, $PWM_{S2}$, $PWM_{S3}$ and $PWM_{S4}$ in the form of a level pulse can be obtained, and the obtained control signals are sent to the over-load blocking module 25.

Figure 6:
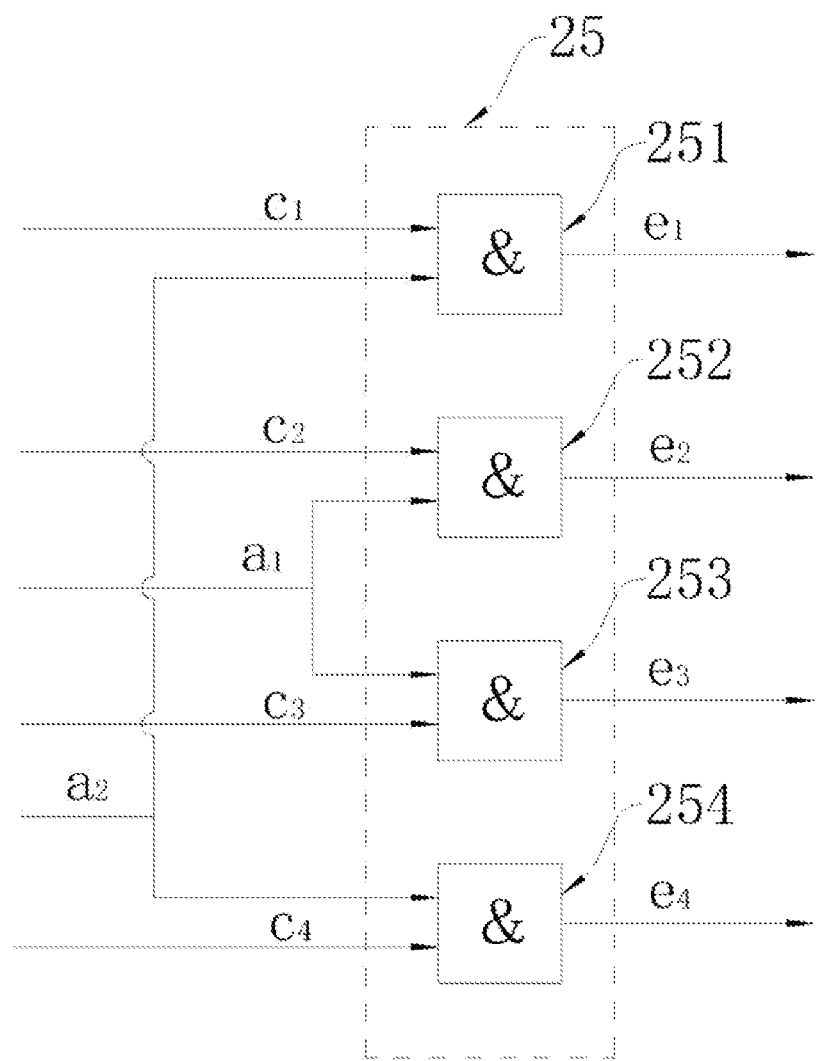
FIG. 6 is a schematic diagram of an over-load blocking module in the present disclosure.

In this embodiment, as shown in FIG. 6, the over-load blocking module 25 includes a first AND unit group and a second AND unit group. An output end of the first AND unit group is correspondingly connected to the first device group 11, and an output end of the second AND unit group is correspondingly connected to the second device group 12. An interface of an input end of the first AND unit group receives the level signal output by the maximum current comparison module 212 and the control signals $PWM_{S1}$ and $PWM_{S4}$ correspondingly output by the pulse width modulation module 24 respectively, so that the first AND unit group controls the first device group 11 to switch on or off the topology 1 according to the level state of the input end.

An interface of an input end of the second AND unit group receives the level signal output by the rated current comparison module 211 and the control signals $PWM_{S2}$ and $PWM_{S3}$ correspondingly output by the pulse width modulation module 24 respectively, so that the second AND unit group controls the second device group 12 to switch on or off the topology 1 according to the level state of the input end.

Specifically, each of the first AND unit group and the second AND unit group includes two AND units, so the entire over-load blocking module 25 includes four AND units, and output ends of the four AND units are respectively communicated with the corresponding four semiconductor devices $S_1$, $S_2$, $S_3$, and $S_4$. Therefore, the four AND units can be respectively correspondingly a first AND unit 251, a second AND unit 252, a third AND unit 253 and a fourth AND unit 254. The first AND unit 251 and the fourth AND unit 254 form the first AND unit group, and the second AND unit 252 and the third AND unit 253 form the second AND unit group.

It can be understood that the input end of the first AND unit 251 can receive the level signal and control signal $PWM_{S1}$ output by the maximum current comparison module 212, and the output end of the first AND unit 251 is communicated to the semiconductor device $S_1$. Thus, according to the working logic principle of an AND circuit, when the input ends are all at a high level, the first AND unit 251 can send an on-off signal to the semiconductor device $S_1$, otherwise the semiconductor device $S_1$ will be blocked.

It can be understood that the input end of the first AND unit 252 can receive the level signal and control signal $PWM_{S2}$ output by the rated current comparison module 211, and the output end of the second AND unit 252 is communicated to the semiconductor device $S_2$. Thus, when the input ends are all at a high level, the second AND unit 252 can send an on-off signal to the semiconductor device $S_2$, otherwise the semiconductor device $S_2$ will be blocked.

The input end of the third AND unit 253 can receive the level signal and control signal $PWM_{S2}$ output by the rated current comparison module 211, and the output end of the third AND unit 253 is communicated to the semiconductor device $S_3$. Thus, when the input ends are all at a high level, the third AND unit 253 can send an on-off signal to the semiconductor device $S_3$, otherwise the semiconductor device $S_3$ will be blocked.

The input end of the fourth AND unit 254 can receive the level signal and control signal $PWM_{S4}$ output by the maximum current comparison module 212, and the output end of the fourth AND unit 254 is communicated to the semiconductor device $S_4$. Thus, when the input ends are all at a high level, the fourth AND unit 254 can send an on-off signal to the semiconductor device $S_4$, otherwise the semiconductor device $S_4$ will be blocked.

A specific working process of the overload mode switching system 2 is as shown in FIG. 1 to FIG. 6.

For the convenience of description, the modulation waveform comparison count values CMP-13 and CMP-24 output by the first calculation unit 233 to the third calculation unit 235 can be represented by $b_1$, $b_2$ and $b_3$. The control signals $PWM_{S1}$, $PWM_{S2}$, $PWM_{S3}$ and $PWM_{S4}$ are output through pulse signals $c_1$, $c_2$, $c_3$ and $c_4$. The on-off signals transmitted by the first AND unit 251 to the fourth AND unit 254 can be represented by $e_1$, $e_2$, $e_3$ and $e_4$.

I. The Topology 1 Works Normally.

(1) At this time, the output current $i_0$ of the topology 1 is less than the rated current $I_{rate}$. The current comparison module 21 enables, according to the output current $i_0$, the level signals $a_1$ and $a_2$ output by the rated current comparison module 211 and the maximum current comparison module 212 to be high levels. The level signal $a_1$ is sent to the channel calculating module 23 and the over-load blocking module 25 respectively, while the level signal $a_2$ is only sent to the over-load blocking module 25.

(2) The first channel selection unit 231 sends value d of the duty cycle signal to the second channel selection unit 232 according to the high-level signal $a_1$. Assuming that value d of the duty cycle signal is greater than or equal to 0 at this time, the second channel selection unit 232 transmits value d of the duty cycle signal to the first calculation unit 233, thus transmitting the obtained modulation waveform comparison count value b1 to the pulse width modulation module 24 through the first calculation unit 233.

(3) The pulse width modulation module 24 can obtain pulse levels of the control signals $PWM_{S1}$, $PWM_{S2}$, $PWM_{S3}$ and $PWM_{S4}$ as shown in FIG. 5 according to the modulation waveform comparison count value $b_1$, and send the pulse levels to the gate unit corresponding to the over-load blocking module 25 through the pulse signals $c_1$, $c_2$, $c_3$ and $c_4$.

(4) Since the level signals $a_1$ and $a_2$ are both high levels, and the pulse signal $c_3$ always outputs a high-level pulse, the third AND unit 253 always sends the high-level on-off signal $e_3$ to the semiconductor device $S_3$ in the topology 1, so that the semiconductor device $S_3$ is switched on in the topology 1. If the pulse signal $c_4$ always outputs a low-level pulse, the semiconductor device $S_4$ in the topology 1 is always in a blocked state. The pulse signals $c_1$ and $c_2$ alternately output the high-level pulse and the low-level pulse, so that the semiconductor devices $S_1$ and $S_2$ in the topology 1 can be on and off alternately through the on-off signals $e_1$ and $e_2$. In this state, the topology 1 can form a three-level circuit with a stable modality, so that the output current $i_0$ of the topology 1 can be output like a traditional three-level single circuit.

II. The Topology 1 is Overloaded.

(1) Assuming that the output current $i_0$ is greater than the rated current $I_{rate}$ and less than the maximum current $I_{max}$, the current comparison module 21 enables, according to the output current $i_0$, the rated current comparison module 211 to output a low-level signal $a_1$ and the maximum current comparison module 212 to output a high-level signal $a_2$. The level signal $a_1$ is sent to the channel calculating module 23 and the over-load blocking module 25 respectively, while the level signal $a_2$ is only sent to the over-load blocking module 25.

(2) The first channel selection unit 231 sends value d of the duty cycle signal to the second channel selection unit 232 according to the high-level signal $a_1$. Assuming that value d of the duty cycle signal is greater than or equal to 0 at this time, the second channel selection unit 232 transmits value d of the duty cycle signal to the third calculation unit 235, thus transmitting the obtained modulation waveform comparison count value $b_3$ to the pulse width modulation module 24 through the third calculation unit 235.

(3) The pulse width modulation module 24 can obtain pulse levels of the corresponding control signals $PWM_{S1}$, $PWM_{S2}$, $PWM_{S3}$ and $PWM_{S4}$ according to the modulation waveform comparison count value $b_3$, and send the pulse levels to the gate unit corresponding to the over-load blocking module 25 through the pulse signals $c_1$, $c_2$, $c_3$ and $c_4$.

(4) Since the level signal $a_1$ is at a low level, the second AND unit 252 and the third AND 253 directly output low-level on-off signals $e_2$ and $e_3$ to the semiconductor devices $S_2$ and $S_3$, so that the semiconductor devices $S_2$ and $S_3$ are in a blocked state. Since the level signal $a_2$ is at a high level, the first AND unit 251 and the fourth AND unit 254 can control at least one of the semiconductor devices $S_1$ and $S_4$ to be in an on state according to the pulse signals $c_1$ and $c_4$, so that the topology 1 can form a two-level circuit with a stable modality, and then the topology 1 can perform stable overload operation.

III. The Topology 1 is Overloaded.

At this time, the output current $i_0$ of the topology 1 is greater than the maximum current $I_{max}$. The current comparison module 21 enables, according to the output current $i_0$, the rated current comparison module 211 and the maximum current comparison module 212 to both output low-level signals $a_1$ and $a_2$. The level signal $a_1$ is sent to the channel calculating module 23 and the over-load blocking module 25 respectively, while the level signal $a_2$ is only sent to the over-load blocking module 25. At this time, the first AND unit 251 to the fourth AND unit 254 can respectively send low-level on-off signals $e_1$ to $e_4$ to the semiconductor devices $S_1$ to $S_4$, so that semiconductor devices $S_1$ to $S_4$ are in a blocked state, thus disconnecting the output of the topology 1 to avoid damage to the topology 1.

In one embodiment of the present disclosure, as shown in FIG. 1, the T-shaped three-level overload operating system also includes a temperature control system capable of modulating frequency 3. The temperature control system capable of modulating frequency 3 can control a pulse width frequency of the pulse width modulation module 24 according to the ambient temperature of the entire T-shaped three-level overload operating system and a working state of the topology 1, thus ensuring that the topology 1 will not overheat during operation.

It can be understood that when the overload mode switching system 2 switches the topology 1 from the overload operation to the two-level circuit for operation, heat of the circuit will increase. If the T-shaped three-level overload operating system is still designed according to traditional three-level heating, it may cause the temperature of the T-shaped three-level overload operating system to exceed an allowable value, thus easily causing the system to be abnormal. If the T-shaped three-level overload operating system is designed according to two-level heating, the heat dissipation cost of the T-shaped three-level overload operating system will increase.

Therefore, by means of adding the temperature control system capable of modulating frequency 3 to the T-shaped three-level overload operating system, the T-shaped three-level overload operating system can run at a normal frequency when the topology 1 works normally. When the topology 1 is overloaded, the T-shaped three-level overload operating system works at variable frequencies according to temperature changes, so as to ensure that a temperature rise does not exceed the allowable value of the system, thus ensuring that the heat dissipation cost of the T-shaped three-level overload operating system does not increase.

Figure 7:
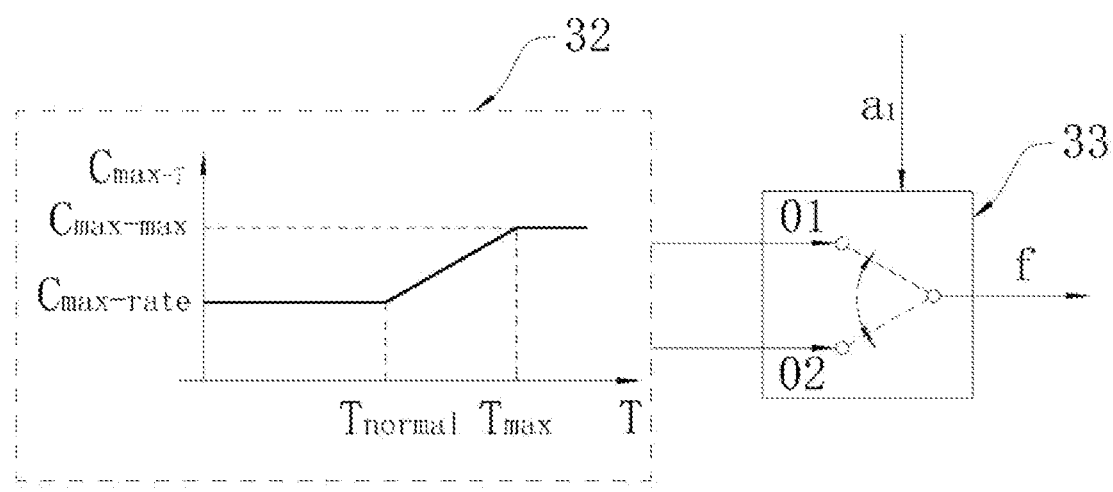
FIG. 7 is a schematic diagram of cooperation between a conversion module and a third channel selection unit in the present disclosure.

In this embodiment, as shown in FIG. 1 and FIG. 7, the temperature control system capable of modulating frequency 3 includes a temperature collection module 31, a conversion module 32 and a third channel selection unit 33. The temperature collection module 31 can collect the ambient temperature of the T-shaped three-level overload operating system. The conversion module 32 can receive varying temperature signals sent by the temperature collection module 31, and converting the temperature signals into different triangular modulation waveform peak signals. An input end of the third channel selection unit 33 is connected to the conversion module 32, and an output end of the third channel selection unit 33 is connected to the pulse width modulation module 24. The third channel selection unit 33 can also receive the level signal of the rated current comparison module 211, so that the third channel selection unit 33 can send, according to low and high-level states of the level signal of the rated current comparison module 211, the different triangular modulation waveform peak signals generated by the conversion module 32 to the pulse width modulation module 24, thereby adjusting a frequency of the control signal sent by the pulse width modulation module 24.

It can be understood that conversion ways adopted by the conversion module 32 for the temperature signals sent by the temperature collection module 31 includes but are not limited to the following ways.

The conversion module 32 can convert the ambient temperature T sent by the temperature collection module 31 into a corresponding triangular wave peak value $C_{max-T}$. Moreover, a threshold of a normal temperature of the T-shaped three-level overload operating system is set to be $T_{normal}$, and the triangular wave peak value $C_{max-T}$ corresponding to the threshold $T_{normal}$ is set to be a set value $C_{max-rate}$.

Thus, when the ambient temperature T is less than the threshold $T_{normal}$, the third channel selection unit 33 can output the constant triangular wave peak value $C_{max-rate}$ to the pulse width modulation module 24 to ensure that the pulse width modulation module 24 works at a constant frequency by the maximum triangular wave count value $C_{max}=C_{max-rate}$.

When the ambient temperature T is greater than the threshold $T_{normal}$, the conversion module 32 can generate a triangular wave peak value $C_{max-T}$ that increases linearly with the increase of temperature. Thus, the third channel selection unit 33 can output the continuously varying triangular wave peak value $C_{max-T}$ to the pulse width modulation module 24 to ensure that the pulse width modulation module 24 works at variable frequencies by $C_{max}=C_{max-T}$.

A specific working process of the temperature control system capable of modulating frequency 3 is shown in FIG. 1, FIG. 2, FIG. 5 and FIG. 7.

For the convenience of description, the triangular modulation waveform peak signal output by the third channel selection unit 33 can be represented by f.

I. The Topology 1 Works Normally.

The output current $i_0$ of the topology 1 is less than the rated current $I_{rate}$, so the rated current comparison module 211 outputs a high-level signal $a_1$ to the third channel selection unit 33. At this time, the switch of the third channel selection unit 33 is communicated with the output end 02, so the third channel selection unit 33 sends the triangular wave peak value $C_{max-T}=C_{max-rate}$ generated by the conversion module 32 to the pulse width modulation module 24 in the form of a triangular modulation waveform peak signal f, and the pulse width modulation module 24 can work at a constant frequency.

II. The Topology 1 is Overloaded.

The output current $i_0$ of the topology 1 is greater than the rated current $I_{rate}$ and less than the maximum current $I_{max}$, so the rated current comparison module 211 outputs a low-level signal $a_1$ to the third channel selection unit 33. At this time, the switch of the third channel selection unit 33 is communicated with the output end 01, so the third channel selection unit 33 sends the triangular wave peak value $C_{max-T}$ generated by the conversion module 32 to the pulse width modulation module 24 in the form of a triangular modulation waveform peak signal f. At this time, a specific value of the triangular wave peak value $C_{max-T}$ is related to the ambient temperature T.

(1) If the ambient temperature T is less than the threshold $T_{normal}$, the third channel selection unit 33 can output the triangular wave peak value $C_{max-T}=C_{max-rate}$ to the pulse width modulation module 24 to ensure that the pulse width modulation module 24 works at a constant frequency by the maximum triangular wave count value $C_{max}=C_{max-rate}$.

(2) If the ambient temperature T is greater than the threshold $T_{normal}$, the third channel selection unit 33 can output the triangular wave peak value $C_{max-T}$ that changes continuously with temperature changes to the pulse width modulation module 24 to ensure that the pulse width modulation module 24 works at variable frequencies by $C_{max}=C_{max-T}$.

The temperature control system capable of modulating frequency 3 of the present disclosure can be applied not only to the T-shaped three-level topology 1, but also to other topologys. Low-power operation is realized through frequency conversion, thus saving the heat dissipation cost of the system.

Another aspect of the present disclosure provides a working method of the T-shaped three-level overload operating system, including the following steps:

S100: the control module 22 sends the duty cycle signal to the channel calculating module 23.

S200: the current comparison module detects and makes a judgment on the output current of the topology 1, and sends out a judgment result in the form of a level signal.

S300: the channel calculating module 23 receives the duty cycle signal and the level signal, and calculates multiple groups of modulation waveform comparison count values corresponding to the first device group 11 and the second device group 12 according to the level of the level signal and positive and negative states of the duty cycle signal.

S400: the pulse width modulation module 24 can send each group of modulation waveform comparison count values to the over-load blocking module 25 in the form of a control signal.

S500: the over-load blocking module 25 can send the on-off signals to the first device group 11 and the second device group 12 respectively according to the level signal and the control signal.

S600: the conversion module 32 converts the ambient temperature collected by the temperature collection module 31 into different triangular modulation waveform peak signals, and the third channel selection unit 33 sends different triangular modulation waveform peak signals to the pulse width modulation module 24 according to the level signal to adjust the frequencies of the control signals.

In this embodiment, step S200 includes the following specific steps:

S210: the current comparison module detects that an output current of the topology 1 is $i_0$, and compares the output current $i_0$ with a rated current $I_{rate}$ and a maximum current $I_{max}$.

S220: both the rated current comparison module 211 and the maximum current comparison module 212 both output high-level signals if an absolute value of the output current $i_0$ is less than the rated current $I_{rate}$, otherwise, the next step is executed.

S230: if an absolute value of the output current $i_0$ is greater than the rated current $I_{rate}$ and less than the maximum current $I_{max}$, the rated current comparison module 211 outputs a low-level signal, and the maximum current comparison module 212 outputs a high-level signal; otherwise, both the rated current comparison module 211 and the maximum current comparison module 212 output low-level signals.

In this embodiment, step S300 includes the following specific steps:

S310: the first channel selection unit 231 receives the level signal $a_1$ of the rated current comparison module 211 and value d of the duty cycle signal.

S320: if the level signal $a_1$ is at a low level, the first channel selection unit 231 transmits value d of the duty cycle signal to the third calculation unit 235, and the third calculation unit 235 can calculate and obtain the modulation waveform comparison count values CMP-13 and CMP-24, and CMP-13-CMP-24=$[(1+d)/2] \times C_{max}$; and if the level signal a is at a high level, the following steps are executed.

S330: the first channel selection unit 231 sends value d of the duty cycle signal to the second channel selection unit 232.

S340: if value d of the duty cycle signal is greater than or equal to 0, the second channel selection unit 232 sends value d of the duty cycle signal to the first calculation unit 233, and the first calculation unit 233 can calculate and obtain the modulation waveform comparison count values CMP-13=$d \times C_{max}$ and CMP-24=$C_{max}$; otherwise, the next step is executed.

S350: if value d of the duty cycle signal is less than 0, the second channel selection unit 232 sends value d of the duty cycle signal to the second calculation unit 234, and the second calculation unit 234 can calculate and obtain the modulation waveform comparison count values CMP-13=0 and CMP-24=$(1+d) \times C_{max}$.

In this embodiment, step S600 includes the following specific steps:

S610: the temperature collection module 31 collects an ambient temperature T, and sends the ambient temperature to the conversion module 32.

S620: the conversion module 32 converts the temperature T into a triangular wave peak value $C_{max-T}$, and transmits the triangular wave peak value $C_{max-T}$ in the form of a triangular modulation waveform peak signal.

S630: the third channel selection unit 33 can receive the triangular modulation waveform peak signal and the level signal $a_1$ of the rated current comparison module 211.

S640: if the level signal $a_1$ is at a high level, the third channel selection unit 33 sends the triangular modulation waveform peak signal to the pulse width modulation module 24 such that the maximum triangular wave count value $C_{max}$ is a constant value $C_{max-rate}$ and the pulse width modulation module 24 works at a constant frequency; and if the level signal $a_1$ is at a low level, the next step is executed.

S650: the third channel selection unit 33 the triangular wave peak signal to the pulse width modulation module 24 such that the maximum triangular wave count value $C_{max}$ is a triangular wave peak value $C_{max-T}$ that correspondingly changes with the temperature T, and the pulse width modulation module 24 works at a constant frequency or variable frequencies.

The above describes the basic principle, main characteristics and advantages of the present disclosure. Those skilled in the art should understand that the present disclosure is not limited by the foregoing embodiments. The foregoing embodiments and the description in the specification only illustrate the principles of the present disclosure. The present disclosure may have various changes and improvements without departing from the spirit and scope of the present disclosure, and these changes and improvements all fall within the claimed scope of the present disclosure. The claimed scope of the present disclosure is defined by the appended claims and their equivalents.

What is claimed is:

1. A T-shaped three-level overload operating system, comprising:
   an overload mode switching system; and
   a topology, connected to a first device group and a second device group forming a T shape;
   wherein the first device group is designed with an overload capacity, and the second device group is designed with a rated capacity;
   the overload mode switching system is configured for being connected to the topology, so that the overload mode switching system controls, according to an output current of the topology, the first device group to perform overload two-level operation on the topology, or controls the second device group to perform normal three-level operation on the topology.

2. The T-shaped three-level overload operating system according to claim 1, wherein the overload mode switching system comprises:
   a current comparison module, configured for sending a level signal according to the output current of the topology;
   a control module, configured for sending a duty cycle signal;
   a channel calculating module, configured for receiving a level signal and the duty cycle signal, and calculating a modulation waveform comparison count value according to the received signals;
   a pulse width modulation module, configured for generating control signals corresponding to the first device group and the second device group according to the modulation waveform comparison count value; and
   an over-load blocking module, configured for respectively sending on-off signals to the first device group and the second device group according to the received control signals and level signal such that the first device group or the second device group switches on or switches off the topology.

3. The T-shaped three-level overload operating system according to claim 2, wherein the current comparison module comprises a rated current comparison module and a maximum current comparison module;
   the rated current comparison module and the maximum current comparison module are configured for outputting high-level signals or low-level signals according to the output current of the topological circuit;
   the rated current comparison module is configured for sending the output level signal to the channel calculating module and the over-load blocking module, and the maximum current comparison module is configured for sending the output level signal to the over-load blocking module.

4. The T-shaped three-level overload operating system according to claim 3, wherein the channel calculating module comprises:
   a first channel selection unit, configured for receiving the level signal output by the rated current comparison module and the duty cycle signal of the control module;
   a third calculation unit, connected to an output end of the first channel selection unit such that: when the level signal is at a low level, the third calculation unit calculates the modulation waveform comparison count value according to the received duty cycle signal;

a second channel selection unit, wherein an input end of the second channel selection unit is connected to an output end of the first channel selection unit;

a first calculation unit, connected to an output end of the second channel selection unit; and a second calculation unit, connected to the output end of the second channel selection unit such that: when the level signal is at a high level, the second channel selection unit transmits the level signal to the first calculation unit or the second calculation unit respectively according to positive and negative states of the duty cycle signal, and calculates the modulation waveform comparison count value.

5. The T-shaped three-level overload operating system according to claim 3, wherein the over-load blocking module comprises a first AND unit group and a second AND unit group; an output end of the first AND unit group is correspondingly connected to the first device group, and an output end of the second AND unit group is correspondingly connected to the second device group; an interface of an input end of the first AND unit group receives the level signal output by the maximum current comparison module and the control signal correspondingly output by the pulse width modulation module; and an interface of an input end of the second AND unit receives the level signal output by the rated current comparison module and the control signal correspondingly output by the pulse width modulation module.

6. The T-shaped three-level overload operating system according to claim 3, wherein the T-shaped three-level overload operating system further comprises a temperature control system capable of modulating frequency, and the temperature control system capable of modulating frequency comprises:

a temperature collection module, configured for collecting an ambient temperature and generating a temperature signal;

a conversion module, suitable for receiving varying temperature signals and converting the temperature signals into different triangular modulation waveform peak signals; and a third channel selection unit, wherein an input end of the third channel selection unit is connected to the conversion module, and an output end of the third channel selection unit is connected to the pulse width modulation module; the third channel selection unit is configured for sending the different triangular modulation waveform peak signals to the pulse width modulation module according to the level signal of the rated current comparison module, thereby adjusting a frequency of the control signal sent by the pulse width modulation module.

7. A working method of the T-shaped three-level overload operating system, comprising the following steps:

S100: sending, by the control module, value d of the duty cycle signal to the channel calculating module;

S200: detecting and making a judgment, by the current comparison module, on the output current of the topology, and sending out a judgment result in the form of a level signal;

S300: receiving, by the channel calculating module, value d of the duty cycle signal and the level signal, and calculating multiple groups of modulation waveform comparison count values corresponding to the first device group and the second device group according to the level of the level signal and positive and negative states of the duty cycle signal;

S400: sending, by the pulse width modulation module, each group of modulation waveform comparison count values to the over-load blocking module in the form of a control signal;

S500: sending, by the over-load blocking module, the on-off signals to the first device group and the second device group respectively according to the level signal and the control signal; and S600: converting, by the conversion module, the ambient temperature collected by the temperature collection module into different triangular modulation waveform peak signals, and sending, by the third channel selection unit, different triangular modulation waveform peak signals to the pulse width modulation module according to the level signal to adjust the frequencies of the control signals;

wherein the first device group comprises a semiconductor device $S_1$ and a semiconductor device $S_4$, and the second device group comprises a semiconductor device $S_2$ and a semiconductor device $S_4$.

8. The working method of the T-shaped three-level overload operating system according to claim 7, wherein step S200 comprises the following steps:

S210: comparing, by the current comparison module, an output current $i_0$ of the topology with a rated current $I_{rate}$ and a maximum current $I_{max}$ respectively;

S220: outputting, by both the rated current comparison module and the maximum current comparison module, high-level signals if an absolute value of the output current $i_0$ is less than the rated current $I_{rate}$, otherwise, executing the next step; and S230: if an absolute value of the output current $i_0$ is greater than the rated current $I_{rate}$ and less than the maximum current $I_{max}$, outputting, by the rated current comparison module, a low-level signal, and outputting, by the maximum current comparison module, a high-level signal; otherwise, outputting, by both the rated current comparison module and the maximum current comparison module, low-level signals.

9. The working method of the T-shaped three-level overload operating system according to claim 7, wherein step S300 comprises the following specific steps:

S310: receiving, by the first channel selection unit, the level signal $a_1$ of the rated current comparison module and value d of the duty cycle signal;

S320: if the level signal $a_1$ is at a low level, transmitting, by the first channel selection unit, value d of the duty cycle signal to the third calculation unit, and calculating and obtaining, by the third calculation unit, the modulation waveform comparison count values CMP-13 and CMP-24, and CMP-13=CMP-24-[(1+d)/2]× $C_{max}$; if the level signal $a_1$ is at a high level, executing the following steps:

S330: sending, by the first channel selection unit, value d of the duty cycle signal to the second channel selection unit;

S340: if value d of the duty cycle signal is greater than or equal to 0, sending, by the second channel selection unit, value d of the duty cycle signal to the first calculation unit, and calculating and obtaining, by the first calculation unit, the modulation waveform comparison count values CMP-13=d×$C_{max}$ and CMP-24=$C_{max}$; otherwise, executing the next step; and S350: if value d of the duty cycle signal is less than 0, sending, by the second channel selection unit, value d of the duty cycle signal to the second calculation unit, and calculating and obtaining, by the second calculation unit, the modulation waveform comparison count values CMP-13=0 and CMP-24=(1+d)×$C_{max}$;

wherein CMP-13 represents the modulation waveform comparison count values of the semiconductor devices $S_1$ and $S_3$; CMP-24 represents the modulation waveform comparison count values of the semiconductor devices $S_2$ and $S_4$; and $C_{max}$ represents a maximum triangular wave count value of the pulse width modulation module.

10. The working method of the T-shaped three-level overload operating system according to claim 7, wherein step S600 comprises the following specific steps:

S610: collecting, by the temperature collection module, an ambient temperature T, and sending the ambient temperature to the conversion module;

S620: converting, by the conversion module, the temperature T into a triangular wave peak value $C_{max-T}$, and transmitting the triangular wave peak value $C_{max-T}$ in the form of a triangular modulation waveform peak signal;

S630: receiving, by the third channel selection unit, the triangular modulation waveform peak signal and the level signal $a_1$ of the rated current comparison module;

S640: if the level signal $a_1$ is at a high level, sending, by the third channel selection unit, the triangular modulation waveform peak signal to the pulse width modulation module such that the maximum triangular wave count value $C_{max}$ is a constant value $C_{max-rate}$ and the pulse width modulation module works at a constant frequency; if the level signal $a_1$ is at a low level, executing the next step; and S650: sending, by the third channel selection unit, the triangular wave peak signal to the pulse width modulation module such that the maximum triangular wave count value $C_{max}$ is a triangular wave peak value $C_{max-T}$ that changes with the temperature T, and the pulse width modulation module works at a constant frequency or variable frequencies.

\* \* \* \* \*